Patented May 27, 1947

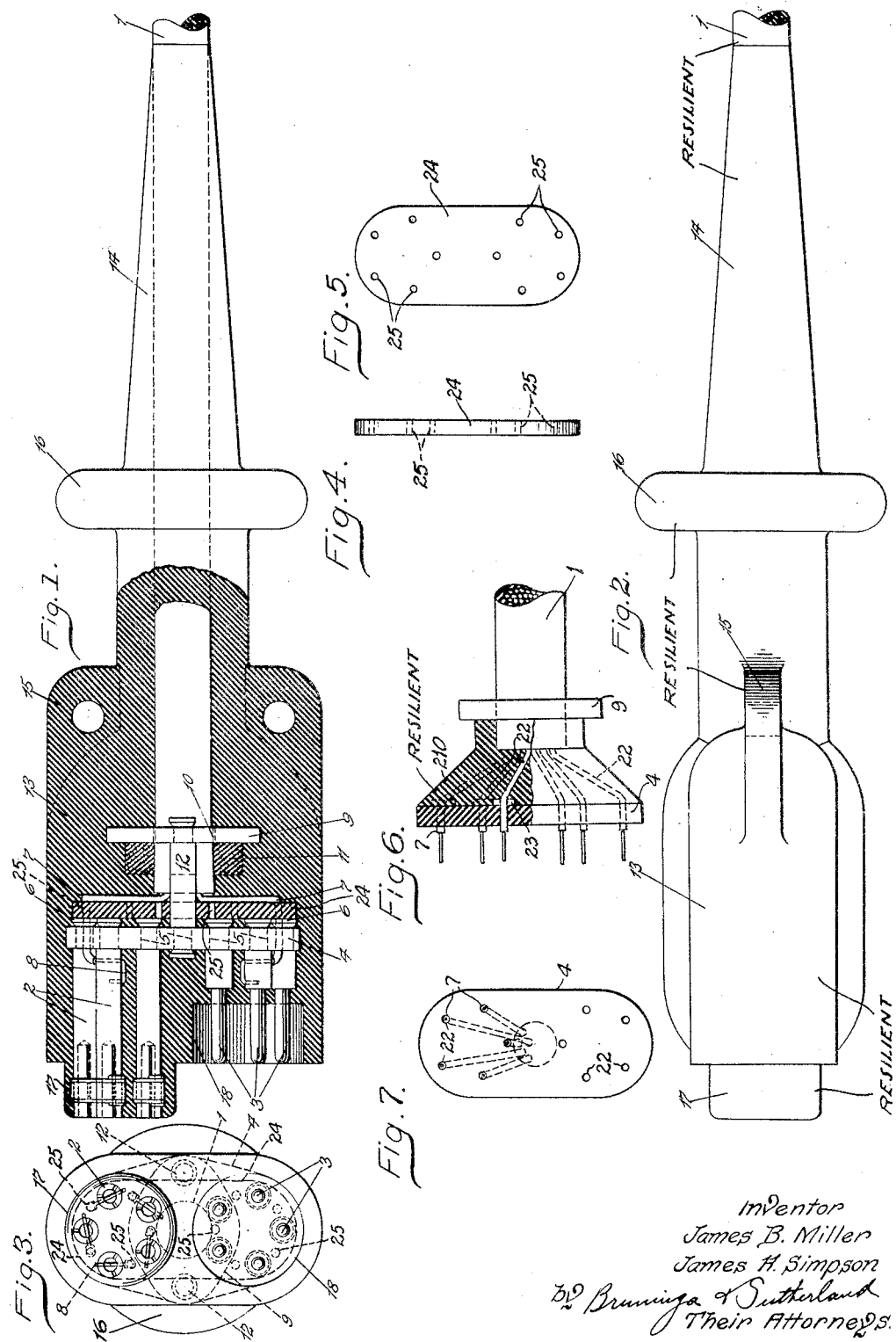

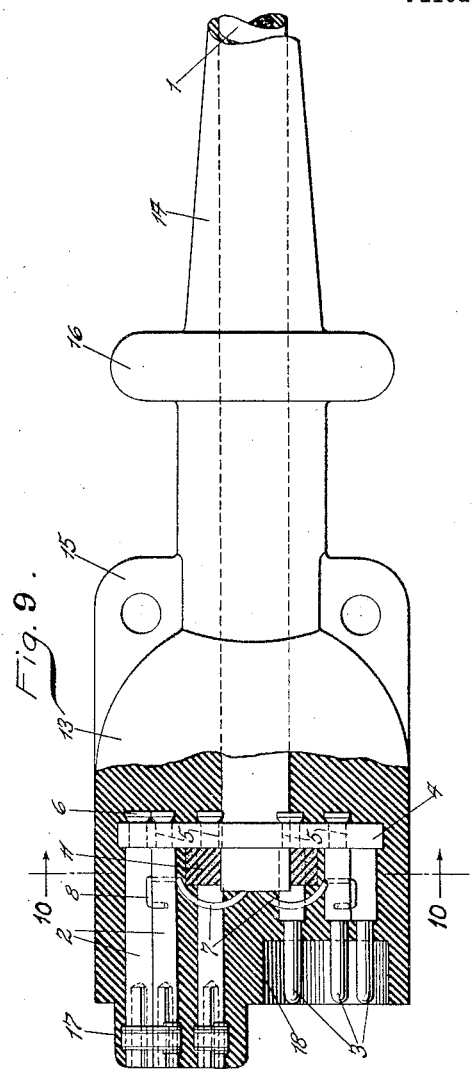

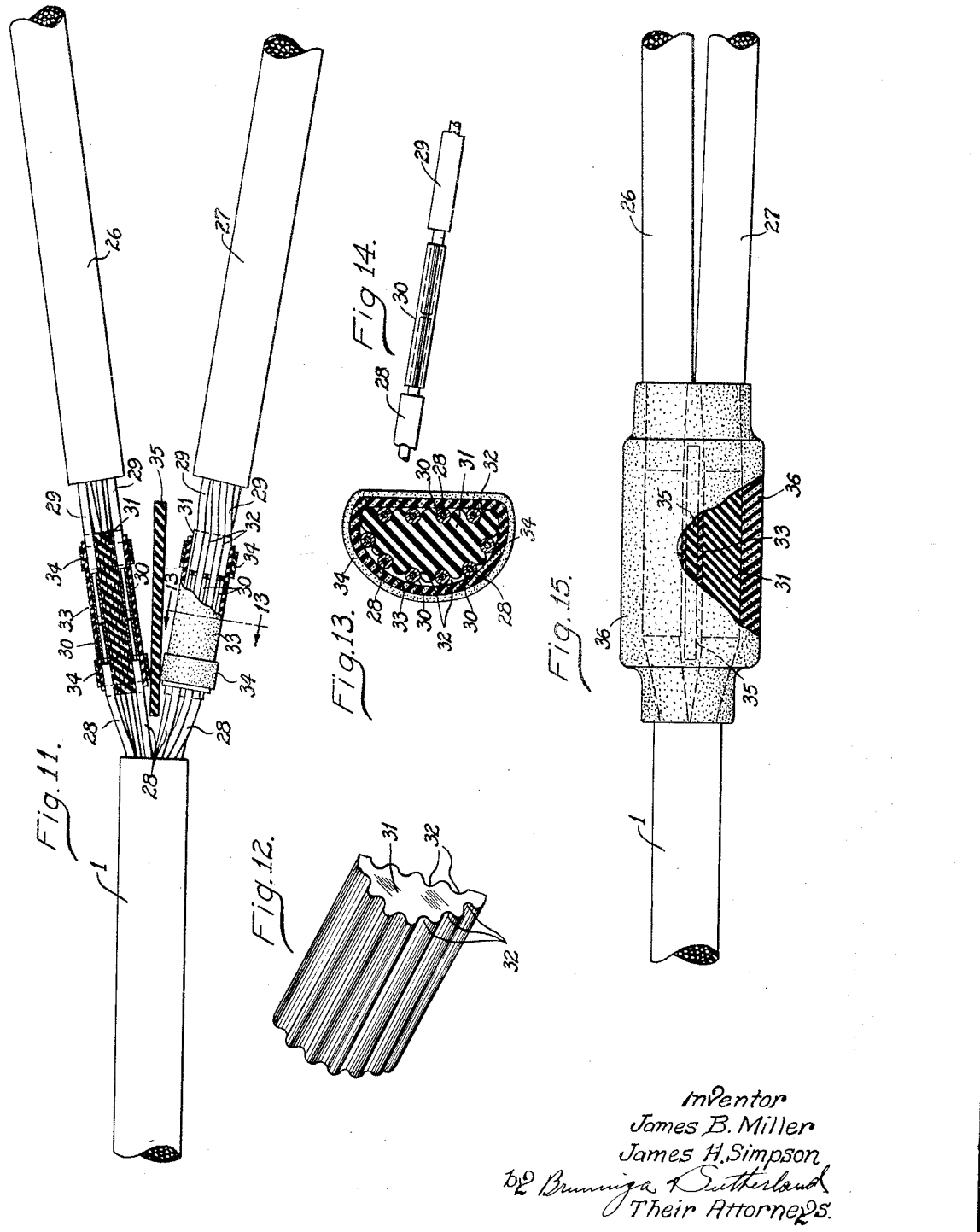

2,421,155

UNITED STATES PATENT OFFICE 2,421,155

ELECTRIC CABLE UNIT AND METHOD OF MAKING THE SAME

James B. Miller, Webster Groves, and James H. Simpson, Maplewood, Mo., assignors to Mines Equipment Company, St. Louis, Mo., a corporation of Missouri Application July 28, 1941, Serial No. 404,302

6 Claims. (Cl. 173—328)

1

This invention pertains to cable units, such as may be used for running temporary circuits. Such units are ordinarily organized to include a length of cable equipped at one or both ends with means for making temporary connections to other cables or circuits. Such connecting means may be plug-and-socket connections or other devices for releasably connecting the individual conductors of a cable to the respective conductors of a source of supply or of a circuit which receives power. While in many cases such units may be used in such a manner as to establish more or less permanent circuits in the sense that they may be installed and left intact for a considerable time, for the purposes of this specification the terms "temporary connection" and "releasable connection" are intended to include all such devices by means of which the connections may be released or the unit removed without the necessity of tools for releasing the same.

Such units often provide so-called extension cables, which may be used to run extension circuits in mines or industrial establishments of any type and are often expected to operate under severe conditions as to liability of damage or exposure to moisture.

One of the objects of this invention, therefore, is to provide a structure for such a unit which will enable it to make connections fully capable of carrying the required current and relatively safe against damage mechanically or from the entrance of moisture to connections.

Another object is to provide an improved method of construction for making the terminal and branch connections for such a unit.

As cables for such service are usually rubber-covered, this invention provides a structure in which the connections may be imbedded in molded rubber which is made integral with the rubber sheath of the cable.

It has been found that in certain molding operations for making connections, for instance, in connecting plug or socket terminals to the ends of a cable which are to be imbedded in rubber, the pressure which is developed in the mold when the rubber passes through the liquid state is sometimes extremely high and has been known to force the cable out of the mold. At other times the cable, without being forced out of the mold, is shifted sufficiently to put a stress upon the circuit wires and their connections to the contact terminals.

Another object of this invention, therefore, is to provide improved anchorage means to prevent the cable from shifting in the mold and to protect the connections of the circuit conductors to the contact members from unnecessary stress.

Another object is to provide an improved structure whereby the danger of forcing the different conductors into contact with each other during the molding operation may be prevented, and thereby the accidental short-circuiting of these conductors during molding may be avoided.

Further objects will appear from the following description taken in connection with the accompanying drawings, in which:

Figure 1 is a longitudinal section of a plug connector embodying this invention.

Figure 2 is a side view of Figure 1.

Figure 3 is an end view of Figure 1.

Figures 4 and 5 are, respectively, an edge view and a face view of the guard member shown in Figure 1.

Figure 6 is a detail, partly in section, showing a view similar to Figure 1, of another way of forming the anchoring means for the cable.

Figure 7 is an end view of Figure 6.

Figure 8 is a view, partly in section, illustrating one way of mounting the structure of Figure 1 in the mold.

Figure 9 is a view similar to Figure 1, showing another arrangement of the anchoring lug on the cable.

Figure 10 is a section on line 10—10 of Figure 9.

Figure 11 is a view, partly in section, showing the structure of a junction between the main cable and two terminal sections.

Figure 12 is an enlarged detail of the guard or spacer used in Figure 11.

Figure 13 is an enlarged section on line 13—13 of Figure 11.

Figure 14 is an enlarged view, showing a splice between individual cable conductors, and Figure 15 is a view, partly in section, showing the completed junction of Figure 11.

In order to clarify the terminology used in this specification, the term "junction" will be used as including a junction between the cable conductors and other conductors, either of a terminal branch as in Figure 11, or of terminal conductors as in Figures 1 and 9. The term "cable conductor" will be used to indicate the individual circuit wires of a multi-conductor cable. The term "pre-vulcanized" will be used in referring to members made of rubber and vulcanized to their finished state before applying them to the junction. These may later be imbedded in the completed rubber body, which is thereafter molded and vulcanized itself. By the term "rubber" as used in this specification and the appended claims is meant ordinary soft rubber which is resilient and pliable. Similarly the term "pre-vulcanized" is intended to mean vulcanized to the condition of ordinary soft rubber. Ordinary soft rubber is such as used for making automobile tires, rubber hose and tubing. This is the kind of rubber usually used for molding a connector directly onto a cable.

Referring now to the drawings, the structure illustrated is intended for connecting a plurality of circuit wires contained in a cable 1. In the case illustrated there are ten wires in the cable, five of which are connected to socket members 2 and the other five to plug members 3. In the following description and the appended claims, the term "contact member" will be used to cover both plug and socket members 3 and 2. An anchoring member 4 is provided which is preferably constructed of a rigid insulating material such as fiber, molded plastic, or the like. This member is perforated to receive the reduced shanks 5 of the contact members. The perforations in the member 4 may be made slightly larger so that the shanks 5 fit loosely therein to permit a slight amount of movement or play. In the arrangement illustrated, the ends of the shanks 5 behind the member 4 are upset or enlarged, as indicated at 6, so as to provide a sort of head adapted to engage the rear of the anchorage member 4 to prevent endwise removal of the contact member from the anchorage member. It will be noted that this arrangement provides movable connections between the contact members and the members 4, which permits both endwise movement and side play.

This movement between the contact members and the member 4 provides enough lost motion so that during the molding operation the members 2 and 3 may be accurately located by the supporting pins in the mold so that their spacing may be accurate and independent of the accuracy of location of the perforations in the member 4. Another advantage of this construction is that when the rubber body has been molded around the members 2 and 3, as will presently be described, said members, while accurately located, nevertheless may shift slightly on account of these movable connections and the resiliency of the rubber so as to accommodate themselves to any imperfections in spacing or alignment of the complementary contact members with which they may be engaged.

The conductors or circuit wires 7 of the cable 1 are stripped off the cable insulation for a sufficient length to permit them to be passed around to their respective contact members 2 and 3 to which they are connected by connections 8 of any suitable type. Such connections, of course, should be both mechanically and electrically secure and are preferably soldered in place. In the accompanying drawings only two wires 7 are illustrated in order to avoid confusion. However, there is ordinarily a circuit wire to each member 2 and 3.

In order to provide a secure anchorage for the cable 1 relative to the member 4 and the contact members, this invention provides for applying anchorage means to the cable before it is assembled with the parts 4, 3, and 2. For this purpose the cable is first provided with a rigid anchoring member 9 in the form of a ring or yoke and having a hole 10 through which the end of the cable 1 is passed. After the member 9 has been placed on the cable by passing the cable end through the hole 10, a stop-lug 11 of rubber is molded on the outside of the rubber sheath between the member 9 and the end of the cable. The spacing of the lug 11 from the end of the cable should, of course, be sufficient to permit stripping enough of that end to free a sufficient length of the circuit wires 7. The stop-lug may be formed originally of uncured rubber, and after being placed on the cable as above described, the assembly is placed in a suitable mold and heated so as to vulcanize the lug 11 to the rubber sheath of the cable 1. This lug may be in the form of a ring or collar or of any other suitable form so as to accommodate it to other parts of the device. The stop-lug, having thus been vulcanized and integrally bonded to the cable sheath, provides a secure stop or abutment for the anchoring member 9 to prevent that member from being pulled off the end of the cable.

The anchoring members 4 and 9 may now be connected by one or more studs 12, which may be secured in any suitable manner to both the members 4 and 9. These studs provide both connectors and spacers so as to hold the members 4 and 9 in proper relation to each other. It will be noted that these studs 12 will prevent the cable from being pulled away from the member 4 and therefore will prevent any undesirable stress being placed upon the circuit wires 7. The entire assembly is now placed in a suitable mold. A convenient way of mounting the device in the mold is shown in Figure 8, in which 19 represents the mold end block or a portion thereof. One or more studs 20 are passed through suitable holes drilled in the block 19 and are threaded at their ends into suitable threaded openings in the plate 4, as indicated at 21. In Figure 8 some of the contacts 2 and 3 are omitted so as to show the other parts more clearly. The plate 4 is thus rigidly mounted in the mold so that it may be accurately located. By this arrangement, also, the plate 4 is supported against the pressure of the fluid rubber, which is developed during the molding operation and is secured against shifting by such pressure.

The parts to be imbedded in the molded body may now be covered or surrounded in any suitable manner by uncured rubber, after which by suitable heat treatment the rubber is molded into a body 13, surrounding and imbedding the parts as assembled. The openings left by the studs 20 may be plugged by suitable rubber plugs, preferably in a semi-vulcanized condition, which may be cemented in while the molded rubber is still hot and which will thus become vulcanized in place so as to completely seal said openings. This body is suitably vulcanized to form, when finished, a body of resilient soft rubber in which all the parts are imbedded. This body may be formed so as to extend any desired distance along the cable 1 and preferably terminates in a tapered portion 14 adapted to bring its size down gradually to the size of the cable 1 and, at the same time, provide a stiff shank which will prevent sharp bends or kinks in the cable close to the body 13. Any suitable auxiliary devices may be molded on the body 13 at this time, such as supporting ears 15 and handle 16.

The end of the body 13 is preferably formed with a projecting portion 17 at that part in which the socket members 2 are imbedded and with a recess 18 of the same size and shape as the projection 17, said recess being formed around the plug members 3 so that their contact ends may project into said recess. By means of this arrangement a complementary plug connector of the same design as this one may be placed in engagement so that the plug members of each connector will engage in the socket members of the other, and the projection 17 of one will enter the recess 18 of the other. These projections and recesses are dimensioned so as to provide a snug fit in order to cause them to engage with a yielding pressure, exerted by the walls of the recess 18 upon those of the projection 17 entered therein. By these means a water-tight seal may be established between each of the mutually engaged sets of plug and socket members. No claim is made to this feature in the present application but the same is also disclosed in our co-pending application Serial No. 336,918, filed May 24, 1940, and is claimed in that application. The present application is a continuation in part of said co-pending application.

In the embodiment illustrated in Figure 9 the anchoring member 4 is arranged to perform the functions of both members 4 and 9 in Figure 1. In this embodiment the stop-lug 11 is placed in front of the member 4 and the circuit wires 7 are bent back from the cable end to make their proper connections with the members 2 and 3. This structure is somewhat more compact and may be used where space is important and where the tension on the cable 1, which must be taken by the lug 11, is not excessive.

It will be seen that this arrangement provides a structure for a plug connector which may be made so as to be entirely enclosed in soft rubber. Such a structure is capable of withstanding very rough usage without serious deterioration. The mounting of the contact members is such as to provide movable connections between them and the anchoring and spacing member 4, and, accordingly, they may adjust themselves to the supports in the mold so as to assume properly spaced relations therein. Under these conditions the contact members will retain their proper spacings when the body 13 has been molded around them, and, accordingly, said members are more accurately spaced in the finished connector. In addition to this, they are capable of slight shifting in the body 13, as that body is yieldable to permit such shifting. Thus, these members may at all times accommodate themselves to the complementary contact members with which they must be engaged.

The arrangement of the stop-lug 11 is such as to provide an element integrally bonded with the cable sheath and arranged to take up any tension which the cable would otherwise tend to put upon the circuit connections. In both embodiments this stop-lug is so combined with the rest of the structure as to prevent any undesirable tension being placed upon the circuit wires.

It has been found that during the molding operation to form the body 13, if the lengths of the conductors 7 between the end of the cable 1 and the member 4 are loose, there is some danger that the molding pressure will force these conductors against each other or against the ends 6 of the terminals with consequent danger of short-circuiting at these points. In accordance with this invention, therefore, a guard 24, formed of rubber and pre-vulcanized, is interposed between the end of the cable and the member 4. This guard extends along the member 4 and is provided with perforations 25, matching the perforations 22 in the member 4, through which the conductors 7 are passed for connection with the terminals 2 and 3. The conductors 7 are then spread outwardly behind the guard 24 and their ends passed through the perforations 25 and 22, which will then be in alignment.

The member 24, therefore, provides a guard or spacer which prevents contact of the wires 7 with each other or with the ends 6 of the terminals. During the molding operation, when the rubber of the main body 13 becomes liquid, the guard 24, being pre-vulcanized, is not liquified but retains its solid state and effectually serves to guard the conductors 7 against accidental contact with other parts which may cause injury. This arrangement, therefore, insures against accidental short-circuits being made during the molding operation.

In the structures shown in Figures 6 and 7 the stop-lug 11, which is molded to the end of the cable, is shown in the form of a combined stop-lug and spacer 210. This may be molded on the end of the cable sheath and vulcanized, as described for the collar 11. In this case it is extended beyond the end of the sheath and its outer and flared end formed to the outline of the anchoring member 4. During the molding operation the cable conductors 7 may be arranged in the mold so that their ends are spaced in such a way as to match the perforations 22 in the member 4. When the body of the element 210 is molded, these conductors will then become imbedded in the rubber, as indicated in Figure 6. During this molding operation, recesses 23 may also be formed to accommodate the ends of the terminals 2 and 3. As in the case of the collar 11, the anchoring member 9 has been placed on the cable before molding the part 210. Accordingly, when the latter part has been finished, the member 4 with its assembled terminals 2 and 3 may be placed upon the outer end, while the member 9 is brought up behind the stop-lug and the two may then be suitably connected by the studs 12. By this arrangement the member 210 forms not only a stop-lug but a spacer between the members 4 and 9 and also a pre-vulcanized spacer or guard between the individual cable conductors 7.

In some cases where a cable contains a relatively large number of conductors, it becomes impractical to make a plug-and-socket connection with so many terminals. This is due to a number of causes arising from the difficulty of accurately aligning such a large number of terminals, the excessive expense of molds, and the like. In such cases it has been found advantageous to divide the cable by making a junction between it and two or more terminal cables, each of which has a reduced number of conductors. Suitable plug and socket terminals are then formed on each of the sub-cables. For instance, a cable having, say, twenty wires which may be arranged in ten pairs, would by this arrangement be joined to two smaller cables, each having ten wires. The conductors of the main cable are divided into fractional groups, in this example each group containing ten wires or five pairs. Each group is then spliced to one of the sub-cables.

Such a junction is illustrated in Figures 11 to 15, inclusive. The main cable 1 is connected to a pair of sub-cables 26 and 27. The conductors of the cable 1, having been divided into two groups, the conductors of one group are spliced individually to the conductors of the cable 26, while those of the other group are spliced individually to the conductors of the cable 27. Such a splice may be made in a simple manner, as illustrated in Figure 14. In this figure the conductors 28 and 29, belonging respectively to the cables 1 and 27, have the insulation stripped from their ends for a suitable distance and those ends inserted in a small copper sleeve 30, which may be formed by simply rolling sheet copper on a suitable mandrel. When the ends have been inserted in the sleeve, the same may be soldered so as to make a permanent connection.

In order to insure against the individual conductors or their splices coming into contact with each other during the molding operation, a guard or spacer 31 of pre-vulcanized rubber is provided. In the embodiment illustrated, this spacer is provided with a series of recesses 32 extending therealong. This guard is placed between the individual conductors, and the conductors and their splices 30 are laid into the recesses 32, as illustrated in Figure 13. The member 31 is shown as being a substantially semi-circular cross section and is provided with grooves 32 both on its flat side and on its convex side. Such a spacer is applied to each group, that is, one for the cable 27 and one for the cable 26, and the two are arranged with their flat faces toward each other so that when they are moved close together, a substantially cylindrical outside surface is formed.

When the conductors have been laid into the recesses in the member 31, they may be secured in any suitable manner and are enveloped with a suitable layer of uncured rubber, indicated at 33, which may be secured in turn by a binding 34 of the same material. When this has been done, another spacer 35 of pre-vulcanized rubber may be placed between the two groups, as shown in Figure 11. The spacer 35 may be simply a suitable piece of sheet rubber cut to the proper size.

The two groups may then be brought together with the spacer 35 therebetween, and the entire junction may then be enveloped in uncured rubber. This is usually done by wrapping it with tape of uncured rubber to a suitable thickness, after which it is placed in a suitable mold in which the entire mass is molded and vulcanized to a final form, as illustrated in Figure 15. In this figure the outside body of molded rubber is indicated at 36. The spacer 31 is seen in section, the several conductors passing through the recesses therein are not in view in this figure. The spacer 35 appears between the two groups, the material of the main body 36 filling all intervening spaces so that the spliced conductors are completely imbedded in resilient rubber.

It will be noted that in the structures of Figures 11 to 15, as in that of Figures 1 to 7, a junction is made by connecting the cable conductors of the main cable 1 individually to other conductors which eventually lead to terminals. In the arrangement of Figure 1, the other conductors are the terminals 2 and 3 themselves. In the arrangement of Figure 11, the conductors of the cables 26 and 27 are connected to similar terminals at their ends. The different splices or connections between the conductors are separated against accidental contact under the molding pressure by means of one or more guards or spacers formed of pre-vulcanized rubber. These spacers remain intact during the molding operation and do not become liquid as does the uncured rubber. Accordingly, they maintain the separation of the several conductors, insuring against accidental contact between them. However, when the molding operation is complete, these spacers are homogeneously united with the molded rubber body. Accordingly, the conductors are finally imbedded in a body of molded rubber which is resilient throughout.

It will be clear, of course, that cable units of this type may be made up to include any desired combination of the individual features described, and the employment of any such combination including more or less of these separate features is contemplated by this invention when within the scope of the appended claims.

It is obvious that various changes may be made in the details of construction or procedure within the scope of the appended claims without departing from the spirit of this invention, and therefore that the invention is not limited to the specific details shown and described.

The invention having thus been described, what is claimed is:

1. In combination with a molded connector of the character described, a cable formed with a permanent, resilient rubber-like sheath throughout its length, a rigid anchor member on said sheath, and vulcanized rubber means securing said anchor member to said sheath.

2. In combination with a molded connector of the character described, a cable formed with a permanent, resilient rubber-like sheath, a rigid anchor member on said sheath, and a stop-lug vulcanized to said sheath between said anchor member and the end of the sheath.

3. In the art of molding connectors on rubber-covered electric cables, the method comprising, passing an end of the cable through a hole in a rigid anchoring member, thereafter molding on the cable end a rubber stop-lug larger than said hole to provide a stop for the anchoring member, and molding the lug and stop into a connector body.

4. In the art of molding connectors on rubber-covered electric cables, the method comprising, passing an end of the cable through a hole in a rigid anchoring member, thereafter molding on the cable end a rubber stop-lug larger than said hole to provide a stop for the anchoring member, securing one or more contact parts to the anchorage member, and then molding a rubber body over the anchorage member and stop-lug to imbed the same therein.

5. A cable unit of the character described having connections between the cable conductors thereof and terminal conductors, anchorage means for said terminal conductors adjacent said connections, said means and connections being molded in rubber, and a pressure guard of pre-vulcanized resilient rubber positioned adjacent said anchorage means to separate the several conductors at said connections to prevent their being forced together under the molding pressure.

6. In a molded plug connector of the character described, a body of resilient molded material, a plurality of contact members, anchoring means to which said members are secured, said means and members being molded in said body, a cable having circuit conductors covered by a continuous sheath, said conductors having connections to said members, separate anchoring means for said cable secured to said sheath, independently of said first anchoring means and spacing means positively spacing said second anchoring means relatively to said first anchoring means, said second anchoring means also being molded in said body.

JAMES B. MILLER.
JAMES H. SIMPSON.

REFERENCES CITED

The following references are of record in the file of this patent:

UNITED STATES PATENTS

| Number | Name | Date |
|---|---|---|
| 1,418,171 | Raettig | May 30, 1922 |
| 2,091,851 | Halvorson | Aug. 31, 1937 |
| 2,054,612 | White | Sept. 15, 1936 |
| 2,264,803 | Jacobs | Dec. 2, 1941 |
| 1,637,046 | Montsinger | Dec. 2, 1927 |
| 2,310,423 | Gold | Feb. 9, 1943 |
| 2,209,814 | Finger | July 30, 1940 |
| 1,974,297 | Benander | Sept. 18, 1934 |
| 1,487,937 | Griffin | Mar. 25, 1924 |
| 2,299,140 | Hanson | Oct. 20, 1942 |
| 483,074 | Marsh | Sept. 20, 1892 |
| 640,365 | Candee | Jan. 2, 1900 |
| 2,251,351 | Cooper | Aug. 5, 1941 |
| 2,196,052 | Benander | Apr. 2, 1940 |
| 1,565,321 | Frantz | Dec. 15, 1925 |
| 472,933 | O'Connor | Apr. 12, 1892 |

FOREIGN PATENTS

| Number | Country | Date |
|---|---|---|
| 31,994 | Netherlands | Feb. 15, 1934 |
| 599,907 | Germany | July 11, 1934 |
| 121,906 | Switzerland | Sept. 16, 1927 |
| 459,559 | Great Britain | Jan. 11, 1937 |